United States Patent [19]

Yamada et al.

[11] Patent Number: 4,604,899
[45] Date of Patent: Aug. 12, 1986

[54] SEMICONDUCTOR-TYPE PRESSURE TRANSDUCER

[75] Inventors: Kazuji Yamada; Hideo Sato, both of Hitachi; Kanji Kawakami, Mito; Kazuo Kato, Ibaraki; Takao Sasayama, Hitachi, all of Japan

[73] Assignee: Hitachi, Ltd., Tokyo, Japan

[21] Appl. No.: 597,753

[22] Filed: Apr. 6, 1984

[30] Foreign Application Priority Data

Apr. 6, 1983 [JP] Japan ................................ 58-59307

[51] Int. Cl.[4] .......................... G01L 9/04; G01L 19/04
[52] U.S. Cl. ............................................ 73/708; 338/4
[58] Field of Search ................ 73/708, 720, 721, 726, 73/727, DIG. 4, 766, 765; 338/4; 324/65 R; 323/365, 367

[56] References Cited

U.S. PATENT DOCUMENTS 4,337,665 7/1982 Sato et al. ............................ 73/708

FOREIGN PATENT DOCUMENTS 3131431 2/1983 Fed. Rep. of Germany ........ 73/766

Primary Examiner—Donald O. Woodiel
Attorney, Agent, or Firm—Antonelli, Terry & Wands

[57] ABSTRACT

A semiconductor-type pressure transducer is disclosed in which the pressure change is detected as a resistance change by use of a bridge circuit including at least a gauge resistor changing with an external force. Each gauge resistor is made of a PN junction of a semiconductor. The pressure transducer further comprises an amplification factor compensator for cancelling the effect of the temperature change of the gauge resistors making up the bridge circuit on the amplification factor of the amplification circuit for amplifying the output of the bridge circuit.

6 Claims, 5 Drawing Figures

4,604,899

SEMICONDUCTOR-TYPE PRESSURE TRANSDUCER

The present invention relates to a semiconductor-type pressure transducer, and more in particular to a semiconductor-type pressure transducer comprising means for compensating for changes in sensor sensitivity with temperature variation.

A semiconductor-type pressure transducer having compensation for changes in sensitivity with temperature variation of the pressure transducer is known, as disclosed, for example, in the Monolithic Pressure Transducers Catalog issued by National Semiconductor in 1979, in which a thin diaphragm section is formed at the central part of a silicon single crystal plate, four gauge resistors are formed by impurity diffusion on the surface of the diaphragm and connected to make up a bridge circuit, and a temperature-compensating transistor circuit is integrally formed on the surface of the diaphragm or the surrounding thick portion of the silicon single crystal plate and connected in series between the bridge circuit and a power supply.

This circuit is capable of reducing the sensitivity changes due to temperature variation of the bridge circuit. However, the transducer is generally used in combination with an amplifier for amplifying the output of the bridge circuit and the amplification factor of the amplifier also changes with temperature variation. As a result, an accurate output is unobtainable solely by a temperature compensation circuit arranged for compensating for the sensitivity change of the bridge circuit alone.

The object of the present invention is to provide a semiconductor-type pressure transducer which is capable of reducing the change of the amplification factor of the amplifier for amplifying the output of a bridge circuit of the transducer due to temperature variation thereof.

According to the present invention, a semiconductor-type pressure transducer is provided with amplification factor compensation means for cancelling the effects of the temperature changes of gauge resistors making up a bridge circuit have on the amplification factor of an amplifier for amplifying the output of the bridge circuit.

The objects, features and advantageous effects of the invention will be well understood from the following description of the embodiments of the invention in conjunction with the accompanying drawings, in which.

Figure 1:
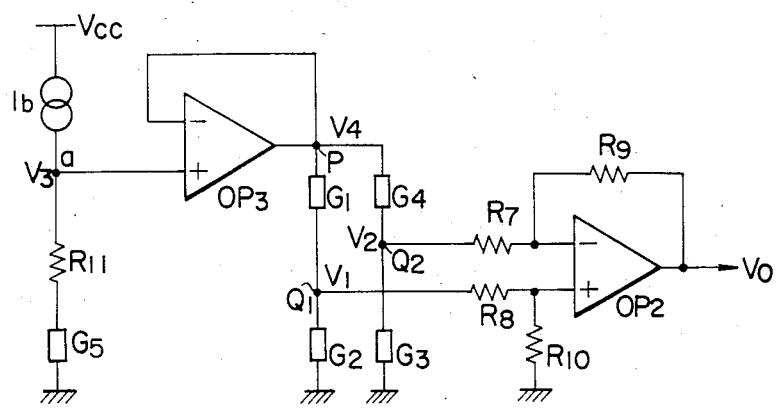
FIG. 1 is a circuit diagram showing an embodiment of the present invention.

An embodiment of the present invention shown in the drawings will be described in detail.

Reference characters $G_1$ to $G_5$ designate gauge resistors made by impurity diffusion in the surface of a silicon diaphragm. Of these gauge resistors, the gage resistors $G_1$ to $G_4$ make up a Wheatstone bridge connected in such a manner that a gauge resistors $G_1$ and $G_2$ are connected to the sides of the bridge circuit, respectively, diagonal to the sides to which the gauge resistors $G_3$ and $G_4$ are connected, respectively.

A drive power circuit connected to the power terminal P of the bridge includes a current source $I_b$ for supplying a current controlled to change in proportion to the temperature of the bridge, a resistor $R_{11}$ in series with the current source $I_b$, a gauge resistor $G_5$, and an operational amplifier $OP_3$ for amplifying the voltage at the junction point a of the current source $I_b$ and the resistor $R_{11}$ to be supplied to the power terminal P of the bridge.

The gauge resistors $G_1$ to $G_4$ are set so that the values of $G_1$, $G_2$, $G_3$ and $G_4$ are equal to a predetermined value G when no pressure is applied to the diaphragm.

The output terminal $Q_1$ of the bridge is connected through a resistor $R_8$ to the positive terminal of the operational amplifier $OP_2$, and the bridge output terminal $Q_2$ is connected to the negative terminal of the operational amplifier $OP_2$ through the resistor $R_7$.

$R_9$ designates a feedback resistor of the operational amplifier $OP_2$, and $R_{10}$ a dividing resistor.

The resistors $R_7$ to $R_{11}$ are substantially insensitive to temperature changes.

The resistance values of the resistors $R_7$ and $R_9$ are equal to those of the resistors $R_{11}$ and $R_{10}$, respectively.

The voltage $V_4$ at the power terminal P of the bridge is regulated to be equal to the voltage $V_3$ at point a by a voltage follower circuit made up of the operational amplifier $OP_3$.

When pressure is exerted on the diaphragm carrying the bridge, the balance of the bridge is broken so that the potential difference $V_1 - V_2$ between the output terminals $Q_1$ and $Q_2$ changes according to the applied pressure.

A balanced-input type amplifier circuit including the operational amplifier $OP_2$ and the resistors $R_7$ to $R_{10}$ is for amplifying the output voltage $V_1 - V_2$ of the bridge into an output voltage value $V_0$.

Now, assume that the temperature around the bridge is changed while maintaining constant the voltage $V_4$ of the power terminal P and the pressure applied to the diaphragm. The output of the bridge $V_1 - V_2$ changes with temperature variation along the curve 9 depicted in FIG. 2.

In the curve 9, it is assumed that $V_0 = V_1 - V_2$. The sensitivity change rate δ of the bridge is expressed by $$\delta = \frac{V_0(T) - V_0(20)}{V_0(20)} \times 100(\%) \quad (1)$$

where $V_0(T)$ is the bridge output at temperature T and $V_0(20)$ the bridge output at 20° C. (reference temperature).

Figure 2:
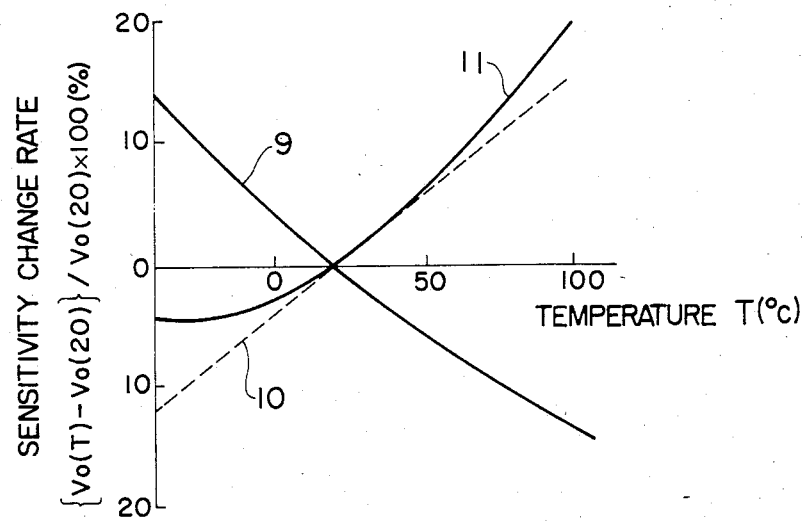
FIG. 2 is a diagram showing the characteristic for explaining the present invention.

From this, it is seen that the bridge sensitivity change with temperature variation may be compensated for by controlling the voltage $V_4$ applied to the bridge power terminal P so as to follow the dashed curve 10 in FIG. 2 which is inclined oppositely to the curve 9 with temperature.

For this purpose, the current source $I_b$ is so constructed that the output current thereof changes in proportion to temperature.

The problem of this circuit, however, is that the amplification factor of the amplification circuit including the operational amplifier $OP_2$ changes with variation of the resistance values of the gauge resistors $G_1$ to $G_4$, which in turn change with temperature variation, thereby preventing optimum compensation.

This fact will be explained semi-quantitatively. The constants of an amplifier circuit of the pressure transducer are generally determined to fulfill the condition $G << R_8 + R_{10}$. The relation between the output $V_0$ of the amplifier circuit and the bridge output $V_1 - V_2$ is thus expressed by the proximation $$V_0 \cong \frac{R_9}{R_7 + \frac{1}{2}G} (V_1 - V_2) \quad (2)$$

The amplification factor K of the amplifier circuit is thus given by $$K = \frac{R_9}{R_7 + \frac{1}{2}G} \approx \frac{R_9}{R_7 + \frac{1}{2}G} \left(1 - \frac{\frac{1}{2}G_0}{R_7 + \frac{1}{2}G_0} \alpha_G(T)\right) \quad (3)$$

$$= \frac{K_0}{1 + \gamma} \left(1 - \frac{\gamma}{1 + \gamma} \alpha_G(T)\right)$$

where $G_0$ is the gauge resistance at the reference temperature, $\alpha_G(T)$ the change of the gage resistance with temperature variation, $K_0$ the amplification factor of an ideal balanced-input amplification circuit ($K_0 = R_9/R_7$), and $\gamma$ the ratio of the resistance $\frac{1}{2}G_0$ to the input resistor $R_7$ ($\gamma = \frac{1}{2}G_0/R_7$).

According as the gauge resistance value $G_0$ increases as compared with the input resistor $R_7$, the effective amplification factor K decreases while the change of the effective amplification factor K with temperature variation follows almost an opposite trend to the change of the gauge resistance G with temperature variation.

As a result, even if the current source $I_b$ were provided with a temperature characteristic so that the voltage $V_4$ applied to the power terminal P follows the curve 10 of FIG. 2, the second term in the brackets { } of equation (3) should cause insufficient compensation due to the decrease of K on high temperature side. This insufficient compensation is derived from the temperature characteristic of the gauge resistor G, and may be compensated for by a resistor formed by the same process as the gauge resistor G. The resistor $G_5$ has such a function.

The condition that the resistor $G_5$ is required to have will be explained.

In consideration of the temperature characteristic of the transducer sensitivity, the equation (2) may be re-written as follows.

$$V_0 \cong K v_0 \{1 + \alpha_S(T)\} \cdot V_4 \quad (4)$$

$$= \frac{K_0 v_0}{1 + \gamma} \left(1 - \frac{\gamma}{1 + \gamma} \alpha_G(T)\right) \{1 + \alpha_S(T)\}$$

where $\alpha_S(T)$ is the change of the output voltage of the pressure transducer bridge with temperature shown in the curve 9 of FIG. 2, and $v_0$ the bridge output per unit drive voltage of the bridge under a predetermine pressure.

The potential $V_3$, on the other hand, is given as $$V_3 = (R_{11} + G_5)I_b \quad (5)$$

$$\cong [R_{11} + G_{50}\{1 + \alpha_G(T)\}]I_{b0}\{1 - \beta_S(T)\}$$

$$= (R_{11} + G_{50})I_{b0}\left(1 + \frac{G_{50}}{R_{11} + R_{50}} \alpha_G(T)\right)\{1 - \beta_S(T)\}$$

$$\cong V_4$$

where $G_{50}$ is the resistance value of $G_5$ at the reference temperature, $I_{b0}$ the output current of the current source at the reference temperature, $\beta_S(T)$ the temperaure-dependent term of the current source $I_b$ with a sign opposite to $\alpha_S$ in equation (4) as shown in the curve 11 of FIG. 2. This term is in fact set to $1/(1+\alpha_S)-1$. For facilitating the understanding, however, it is assumed that $1/1+\alpha_S \cong 1-\alpha_S$.

Therefore, if the following equation (6) is satisfied, $$G_{50}/R_{11} \cong \gamma \quad (6)$$

a relation (7) is obtained by applying the equation (5) to the equation (4) and ignoring the temperature-dependent terms of high order $$V_0 \cong K_0 v_0 R_{11} I_{b0} \quad (7)$$

This relation (7) shows that the voltage $V_0$ is independent of temperature.

The foregoing description is summarized as follows:

(1) The temperature characteristic of the current source $I_b$ is made equal to the characteristic shown by curve 11 in FIG. 2.

(2) The ratio between the resistor $R_{11}$ and the gage $G_5$ is selected to satisfy $$G_5/R_{11} \cong \frac{1}{2}G/R_7 \quad (8)$$

When the dimensions of the components are set as shown above, the variation of the amplification factor of the amplification circuit dependent on the temperature change of the gauge resistor can be cancelled.

According to present embodiment, in the case the bridge circuit, the amplification circuit and the temperature compensation circuit are formed on the same chip, it is desired that the resistor $G_5$ and the gauge resistors $G_1$ to $G_4$ are made by the same process so as to provide the same temperature characteristic and that the gauge resistor $G_5$ is disposed near to the gauge resistors $G_1$ to $G_4$ so that the former is subject to the same temperature condition as the latter.

The resistor $G_5$, however, may be made as a discrete resistor so long as it has substantially the same temperature characteristic as the gauge resistors $G_1$ to $G_4$ and is subjected substantially to the same temperature conditions as the latter.

Figure 3:
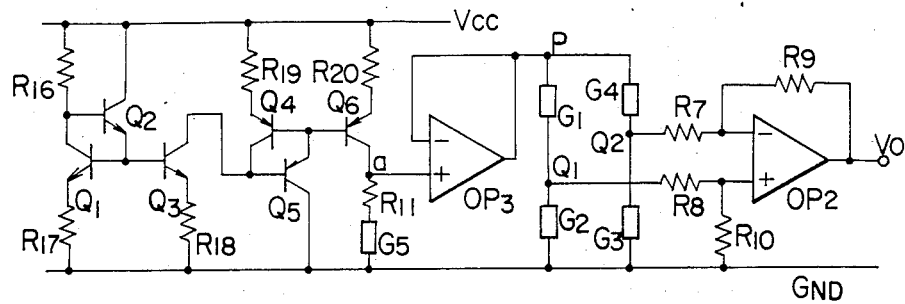
FIG. 3 shows a material circuit arrangement of the embodiment shown in FIG. 1.

FIG. 3 shows a material circuit arrangement of the current source $I_b$. A resistor 20 with an end thereof connected to a power supply $V_{CC}$ has the other end thereof connected to the emitter of the transistor $Q_6$, the collector of which is connected to the junction point a.

The base of the transistor $Q_6$ is connected to the base of the transistor $Q_4$ on the one hand and to the emitter of transistor $Q_5$ on the other hand.

The emitter of the transistor $Q_4$ is connected to an end of the resistor $R_{19}$ the other end of which is connected to the power supply $V_{CC}$. The collector of the transistor $Q_4$ is connected to the base of transistor $Q_5$ and the collector of transistor $Q_3$. The collector of the transistor $Q_5$ is connected to the earth GND.

The emitter of the transistor $Q_3$ is connected to the earth GND through the resistor $R_{18}$, and the base thereof to the emitter of the transistor $Q_2$ and the base of the transistor $Q_1$.

The collector of the transistor $Q_2$ is connected to the power supply $V_{CC}$, and the base thereof to an end of the resistor $R_{16}$ the other end of which is connected to the power supply $V_{CC}$.

The emitter of the transistor $Q_1$ is connected to the earth GND through the resistor $R_{17}$.

The characteristic of the circuit connected in this way is set by adjusting the area ratio of the emitters of transistors $Q_4$ and $Q_6$ and the resistance values of the resistors $R_{19}$ and $R_{20}$ to fit the curve 11 of FIG. 2.

Figure 4:
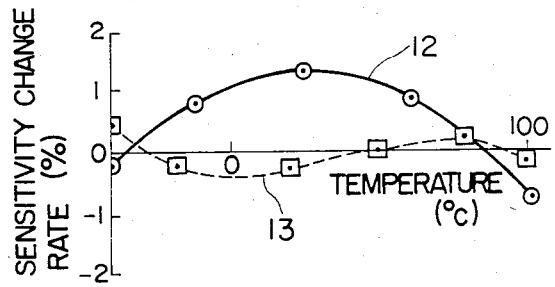
FIG. 4 shows an output characteristic of the circuit of FIG. 3.

FIG. 4 shows the sensitivity change rates of the output $V_0$ of the amplification circuit in the presence and absence of the gauge resistor $G_5$ for comparison therebetween.

The curve 12 shows the change rate in the absence of the gauge resistor $G_5$, and the curve 13 the change rate in the presence of gauge resistor $G_5$.

In the case where the gauge resistor $G_5$ is omitted, the high-order temperature dependent term of $\gamma \alpha_G(T)/1+\gamma$ in equation (4) fails to be compensated, and therefore, the change rate is greater than that in the presence of the gauge resistor $G_5$.

Figure 5:
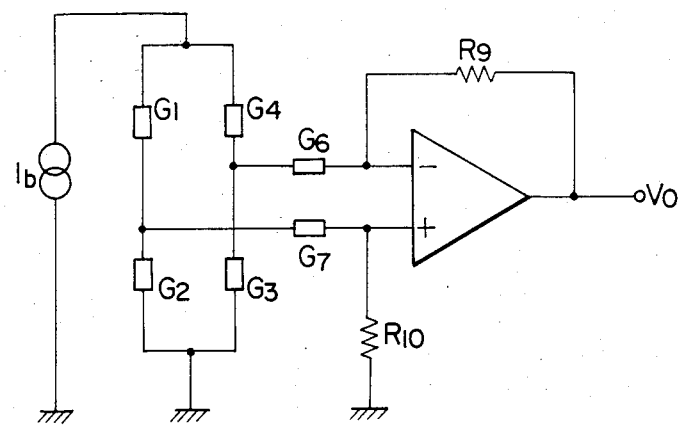
FIG. 5 is a diagram showing another embodiment of the present invention.

Another embodiment of the present invention is shown in FIG. 5.

If the resistors $R_7$ and $R_8$ shown in FIG. 1 are replaced by impurity diffusion resistors $G_6$ and $G_7$ formed in the same process as the gauge resistors $G_1$ to $G_4$, the operational amplifier $OP_3$, and the resistors $R_{11}$ and $G_5$ are eliminated as shown in FIG. 5, so that a voltage can be supplied to the bridge directly from the current source for generating an output current proportional to temperature change.

This is because the function of the gauge resistor $G_5$ to compensate for variation of the amplification factor is given by the resistor $R_7$ if the resistor $R_7$ has the same temperature characteristic as the gauge registors $G_1$ to $G_4$, as seen from equation (8).

It will be understood from the foregoing description that according to the present invention, there is provided a semiconductor-type pressure transducer comprising means for eliminating the effect that the temperature characteristic of the gauge resistors making up the bridge circuit might otherwise have on the amplification factor of the amplification circuit for the bridge output, thereby producing an accurate output of the pressure transducer.

We claim:

1. A semiconductor-type pressure transducer comprising a bridge circuit including a plurality of gauge resistors at least one of which has a resistance which varies with an external force, an amplification circuit connected to an output of said bridge circuit for amplifying the output of said bridge circuit, and a drive power circuit connected to a power source terminal of said bridge circuit and connected between first and second potential voltage levels for supplying a drive voltage to said bridge circuit, wherein said drive power circuit includes a resistor coupled in series between said first and second potential voltage levels and having the same temperature characteristic as that of the gauge resistors for correcting said drive voltage correspondingly to temperature variation of the gauge resistors so as to cancel the effect of the temperature change of the gauge resistors of the bridge circuit on the amplification factor of the amplification circuit.

2. A semiconductor-type pressure transducer according to claim 1, wherein said amplification circuit is an operational amplifier including input and feedback resistors and its amplification factor is a function of the ratio of the input to feedback resistance.

3. A semiconductor-type pressure transducer comprising a bridge circuit including a plurality of gauge resistors at least one of which has a resistance changing with an external force, an amplification circuit for amplifying the output of said bridge circuit, a drive power circuit for supplying a drive voltage to said bridge circuit, and amplification compensation means for cancelling the effect of the temperature change of the gauge resistors of the bridge circuit on the amplification factor of the amplification circuit, wherein said drive power circuit includes a current source for producing an output current proportional to the temperature, and a resistor connected to said current source to pass the output current of said current source, the voltage drop across said resistor being used as a drive power source for the bridge, said resistor having the same temperature characteristics as that of said gauge resistors.

4. A semiconductor-type pressure transducer, comprising a bridge circuit including a plurality of gauge resistors at least one of which has a resistance which varies with an external force, an amplification circuit connected to an output of said bridge circuit for amplifying the output of said bridge circuit, and a drive power circuit connected to a power source terminal of said bridge circuit connected to a power source terminal of said bridge circuit for supplying a drive voltage to said bridge circuit, wherein said drive power circuit includes means for correcting said drive voltage correspondingly to temperature variation of the gauge resistors so as to cancel the effect of the temperature change of the gauge resistors of the bridge circuit on the amplification factor of the amplification circuit, wherein said drive power circuit includes a current source for producing an output current proportional to the temperature and said drive voltage correcting means comprises a resistor connected to said drive power circuit to pass therethrough the output current of said current source and having a temperature-resistance characteristic substantially the same as that of the gauge resistors, the voltage drop across said resistor being used as a drive power source for producing the drive voltage to be supplied to said bridge circuit.

5. A semiconductor-type pressure transducer comprising a bridge circuit including a plurality of gauge resistors at least one of which has a resistance variable with an external force, an amplification circuit connected to an output of said bridge circuit for amplifying the output of said bridge circuit, a drive power circuit connected to a power source terminal of said bridge circuit for supplying a drive voltage to said bridge circuit, and resistor means connected between the output of said bridge circuit and said amplification circuit and having the same temperature characteristic as that of the gauge resistors so as to cancel the effect of the temperature variation of the gauge resistors on the amplification factor of the amplification circuit.

6. A semiconductor-type pressure transducer according to claim 5, wherein said amplification circuit is an operational amplifier including input and feedback resistors and its amplification factor is a function of the ratio of the input to feedback resistance.

* * * * *